United States Patent
Tamura et al.

(10) Patent No.: US 10,400,090 B2
(45) Date of Patent: *Sep. 3, 2019

(54) THERMOPLASTIC RESIN COMPOSITION AND RESIN MOLDED ARTICLE

(71) Applicant: MITSUBISHI ENGINEERING-PLASTICS CORPORATION, Tokyo (JP)

(72) Inventors: Masaki Tamura, Kanagawa (JP); Naohisa Akashi, Tokyo (JP)

(73) Assignee: MITSUBISHI ENGINEERING-PLASTICS CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/427,841

(22) PCT Filed: Sep. 5, 2013

(86) PCT No.: PCT/JP2013/073950
§ 371 (c)(1),
(2) Date: Mar. 12, 2015

(87) PCT Pub. No.: WO2014/042068
PCT Pub. Date: Mar. 20, 2014

(65) Prior Publication Data
US 2015/0210835 A1 Jul. 30, 2015

(30) Foreign Application Priority Data
Sep. 14, 2012 (JP) ................. 2012-203368

(51) Int. Cl.
C08K 7/14 (2006.01)
C08K 3/22 (2006.01)
C08K 3/34 (2006.01)
C08L 77/06 (2006.01)
C08J 5/04 (2006.01)
C08J 5/10 (2006.01)
C08K 5/20 (2006.01)

(52) U.S. Cl.
CPC ................. C08K 7/14 (2013.01); C08J 5/043 (2013.01); C08J 5/10 (2013.01); C08K 3/22 (2013.01); C08K 3/34 (2013.01); C08K 3/346 (2013.01); C08K 5/20 (2013.01); C08L 77/06 (2013.01); C08J 2377/06 (2013.01); C08K 2003/2241 (2013.01)

(58) Field of Classification Search
CPC ........................ C08K 3/22; C08K 2003/2241
See application file for complete search history.

(56) References Cited

U.S. PATENT DOCUMENTS

| | | | | |
|---|---|---|---|---|
| 5,086,105 A | * | 2/1992 | Abe | ............. C08G 65/485 524/262 |
| 5,145,904 A | * | 9/1992 | Muehlbach | ............. C08K 7/04 523/220 |
| 5,474,853 A | * | 12/1995 | Watanabe | ............. C08K 7/04 428/458 |
| 2009/0062452 A1 | | 3/2009 | Harder et al. | |
| 2009/0178708 A1 | | 7/2009 | Higashiyama et al. | |
| 2010/0160140 A1 | | 6/2010 | McGinnis | |
| 2010/0262142 A1 | | 10/2010 | Verfaillie | |
| 2011/0105655 A1 | | 5/2011 | Harder et al. | |
| 2011/0112254 A1 | * | 5/2011 | Manzara | ............. C08G 18/6229 525/275 |
| 2014/0002311 A1 | | 1/2014 | Takano et al. | |
| 2014/0147682 A1 | | 5/2014 | Takano et al. | |

FOREIGN PATENT DOCUMENTS

| | | |
|---|---|---|
| CN | 101070426 A | 11/2007 |
| CN | 101399294 A | 4/2009 |
| CN | 102317224 A | 1/2012 |
| CN | 102604377 A | 7/2012 |
| JP | 2009-79212 A | 4/2009 |
| JP | 2010-1365 A | 1/2010 |
| JP | 2011-503306 A | 1/2011 |
| JP | 2011-504527 A | 2/2011 |
| JP | 2011-241398 A | 12/2011 |
| JP | 2012-513948 A | 6/2012 |
| JP | 5340513 B1 | 11/2013 |
| JP | 2014-43577 A | 3/2014 |
| KR | 10-2011-0099325 A | 9/2011 |
| WO | WO 2010/075258 A1 | 7/2010 |

(Continued)

OTHER PUBLICATIONS

Machine translation of JP2010001365, 2010.*
International Preliminary Report on Patentability and Written Opinion of the International Searching Authority (Forms PCT/IB/338, PCT/IB/373, PCT/ISA/237 and PCT/IB/326) for International Application No. PCT/JP2013/073950, dated Mar. 26, 2015, with an English translation.
International Search Report and Written Opinion of the International Searching Authority (Forms PCT/ISA/210 and PCT/ISA/237) for International Application No. PCT/JP2013/073950, dated Dec. 3, 2013.
Chinese Office Action dated Jul. 19, 2016, for Chinese Application No. 201380043115.2 with the English translation.

(Continued)

Primary Examiner — Wenwen Cai
(74) Attorney, Agent, or Firm — Birch, Stewart, Kolasch & Birch, LLP

(57) ABSTRACT

Provided is a thermoplastic resin composition a resin molded article of which has excellent mechanical strength. The thermoplastic resin composition comprising: a thermoplastic resin; relative to 100 parts by weight of the thermoplastic resin, 0.01 to 30 parts by weight of an additive having a Mohs hardness of 5.5 or larger; and 10 to 200 parts by weight of glass fiber, wherein the glass fiber comprises $SiO_2$ and $Al_2O_3$ in a proportion of 60 to 70% by weight of $SiO_2$ and 20 to 30% by weight of $Al_2O_3$.

8 Claims, No Drawings

(56) References Cited

FOREIGN PATENT DOCUMENTS

WO   WO 2011/059994 A2   5/2011
WO   WO 2012/128219 A1   9/2012

OTHER PUBLICATIONS

Chinese Office Action and Search Report, dated Jan. 29, 2016, for corresponding Chinese Application No. 201380043115.2, with an English translation of the Office Action.
Japanese Office Action, dated Feb. 21, 2017, for corresponding Japanese Application No. 2014-535513, with English machine translation.
Chinese Office Action, dated Dec. 5, 2016, for Chinese Application No, 201380043115.2, together with an English translation thereof.
Korean Office Action, dated May 1, 2019, for corresponding Korean Application No. 10-2015-7003622, with an English translation.

* cited by examiner

THERMOPLASTIC RESIN COMPOSITION AND RESIN MOLDED ARTICLE

TECHNICAL FIELD

This invention relates to a thermoplastic resin composition and a resin molded article obtained by molding the thermoplastic resin composition.

BACKGROUND ART

Resin molded article, obtained by molding a thermoplastic resin composition which is configured by a thermoplastic resin and a glass fiber contained therein, has high levels of mechanical strength, heat resistance and chemical resistance, and has been used as components in the fields of automobile, electric/electronic appliances and precision machine. Such thermoplastic resin composition is also required to be mixed with an additive having a large Mohs hardness, in order to color the resultant resin composition adapted to applications (see Patent Literature 1, for example).

Meanwhile, resin compositions mixed with so-called S-glass have been known as described in Patent Literatures 2 to 4.

CITATION LIST

Patent Literature

[Patent Literature 1] JP-A-2010-1365
[Patent Literature 2] JP-A-2009-79212
[Patent Literature 3] Japanese Translation of PCT International Application Publication JP-T2-2011-503306
[Patent Literature 4] Japanese Translation of PCT International Application Publication JP-T2-2011-504527

SUMMARY OF THE INVENTION

Problems to be Solved by the Invention

However, when an additive having a large Mohs hardness, such as colorant having a large hardness, is added together with a glass fiber to a thermoplastic resin, the resin molded article obtained by molding the thermoplastic resin composition tends to be degraded in the mechanical strength considerably. This is ascribable to that the hard additive may damage the glass fiber, and that the additive per se acts as a foreign matter in the resin molded article to adversely affect the mechanical strength of the resin molded article.

The present invention aims to solve the problems of the prior art described above, thereby providing a thermoplastic resin composition from which a resin molded article having high mechanical strength can be obtained.

Means to Solve the Problems

Under these circumstances, as a result of the inventors careful studies, we achieved the present invention on the basis of the finding that the problems described above can be solved by adding a glass fiber comprising $SiO_2$ and $Al_2O_3$ in a proportion of 60 to 70% by weight of $SiO_2$ and 20 to 30% by weight of $Al_2O_3$ and an additive having a specific hardness to a thermoplastic resin. Specifically, the problems described above were solved by the following means <1>, preferably <2> to <8>.

<1> A thermoplastic resin composition comprising:
a thermoplastic resin;
relative to 100 parts by weight of the thermoplastic resin, 0.01 to 30 parts by weight of an additive having a Mohs hardness of 5.5 or larger; and
10 to 200 parts by weight of glass fiber,
wherein the glass fiber comprises $SiO_2$ and $Al_2O_3$ in a proportion of 60 to 70% by weight of $SiO_2$ and 20 to 30% by weight of $Al_2O_3$.
<2> The thermoplastic resin composition of <1>, wherein the glass fiber has a modulus of elongation of 80 GPa or larger.
<3> The thermoplastic resin composition of <1> or <2>, wherein the glass fiber comprises S-glass.
<4> The thermoplastic resin composition of any one of <1> to <3>, wherein the thermoplastic resin is a polyamide resin.
<5> The thermoplastic resin composition of any one of <1> to <4>, wherein at least one species of the thermoplastic resin is a xylylenediamine-based polyamide resin obtained by polycondensation of a straight chain α,ω-aliphatic dibasic acid and xylylenediamine.
<6> The thermoplastic resin composition of any one of <1> to <5>, further comprising talc and/or a mold releasing agent.
<7> The thermoplastic resin composition of any one of <1> to <6>, wherein the additive having a Mohs hardness of 5.5 or larger is titanium oxide.
<8> A resin molded article obtained by molding the thermoplastic resin composition according to any one of <1> to <7>.

Advantageous Effects of Invention

The present invention makes it possible to provide thermoplastic resin molded articles having high mechanical strength.

THE MOST PREFERRED EMBODIMENTS OF THE INVENTION

The present invention will be explained in detail below. As used herein, each numerical range expressed by two values on both sides of "to" is used to mean the range including the values indicated before and after "to" as lower and upper limits.
<Thermoplastic Resin Compositions>
The thermoplastic resin composition of the present invention is characterized in that the thermoplastic resin composition comprises a thermoplastic resin, and 0.01 to 30 parts by weight of an additive having a Mohs hardness of 5.5 or larger and 10 to 200 parts by weight of a glass fiber per 100 parts by weight of the thermoplastic resin, wherein the glass fiber comprises $SiO_2$ and $Al_2O_3$ in a proportion of 60 to 70% by weight of $SiO_2$ and 20 to 30% by weight of $Al_2O_3$.
<Thermoplastic Resin>
The thermoplastic resin composition of the present invention comprises a thermoplastic resin. The type of the thermoplastic resin is not specifically limited, and examples include polycarbonate resins, alloys of polyphenylene ether resins and polystyrene resins, alloys of polyphenylene ether resins and polyamide resins, thermoplastic polyester resins, methyl methacrylate/acrylonitrile/butadiene/styrene copolymer resins, methyl methacrylate/styrene copolymer resins, methyl methacrylate resins, rubber-reinforced methyl methacrylate resins, polyamide resins, polyacetal resins, polylactic resins, polyolefin resins, polyphenylenesulfide resins and the like.

In the present invention, polyamide resins, thermoplastic polyester resins and polyphenylenesulfide resins are preferably used, more preferably polyamide resins. The thermoplastic resins may be used alone or as a combination of two or more of them.

Polyamide resins are polyamide polymers that contain an acid amide group (—CONH—) in the molecule and that can be melted by heating. Specifically, they include various polyamide resins such as polycondensates of lactams, polycondensates of diamine compounds with dicarboxylic acid compounds, polycondensates of w-aminocarboxylic acids and the like, or copolyamide resins or blends thereof and the like.

Lactams that can be polycondensed into polyamide resins include, for example, ε-caprolactam, ω-laurolactam and the like.

Diamine compounds include, for example, aliphatic, alicyclic and aromatic diamines such as tetramethylenediamine, hexamethylenediamine, undecamethylenediamine, dodecamethylenediamine, 2-methylpentamethylenediamine, 2,2,4- or 2,4,4-trimethylhexamethylenediamine, 5-methylnonamethylenediamine, m-xylylenediamine (MXDA), p-xylylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine and the like.

Dicarboxylic acid compounds include, for example, aliphatic, alicyclic and aromatic dicarboxylic acids such as adipic acid, suberic acid, azelaic acid, sebacic acid, dodecanedioic acid, terephthalic acid, isophthalic acid, 2-chloroterephthalic acid, 2-methylterephthalic acid, 5-methylisophthalic acid, 5-sulfoisophthalic acid sodium salt, hexahydroterephthalic acid, hexahydroisophthalic acid and the like.

ω-Aminocarboxylic acids include, for example, amino acids such as 6-aminocaproic acid, 11-aminoundecanoic acid, 12-aminododecanoic acid, p-aminomethylbenzoic acid and the like.

Specific examples of polyamide resins obtained by polycondensing these materials include polyamide 4, polyamide 6, polyamide 11, polyamide 12, polyamide 46, polyamide 66, polyamide 610, polyamide 612, polyhexamethylene terephthalamide (polyamide 6T), polyhexamethylene isophthalamide (polyamide 6I), poly(m-xylylene adipamide) (polyamide MXD6), poly(m-xylylene dodecamide), polyamide 9T, polyamide 9MT and the like. In the present invention, these polyamide homopolymers or copolymers can be used alone or as a mixture thereof.

Among the polyamide resins described above, polyamide 6, polyamide 66, or xylylenediamine polyamide resins (MX nylons) obtained by polycondensation of straight-chain aliphatic α,ω-dibasic acids with xylylenediamines are more preferably used to improve moldability and heat resistance. Among them, MX nylons are more preferred to improve heat resistance and flame retardance. When the polyamide resins are used as a mixture, the proportion of MX nylons in the polyamide resins is preferably 50% by weight or more, more preferably 80% by weight or more.

MX nylons are preferably used in combination with aliphatic polyamide resins such as polyamide 66, polyamide 6, polyamide 46, polyamide 9T and the like to shorten the molding cycle because MX nylons crystallize somewhat more slowly than aliphatic polyamide resins. Aliphatic polyamide resins used to shorten the molding cycle include rapidly crystallizing polyamide resins such as polyamide 66, polyamide 6, polyamide 46, polyamide 9T and the like and polyamide resins having a high melting point such as polyamides 66/6T, 66/6T/6I and the like, among which polyamide 66 or polyamide 6 is preferred from an economic viewpoint. From the viewpoint of the balance between moldability and physical properties, the contents of the aliphatic polyamide resins is preferably less than 50% by weight of the total polyamide resin, more preferably 1 to 20% by weight, to improve moldability and the balance between physical properties. Good heat resistance can be maintained by adding less than 50% by weight of the aliphatic polyamide resins. Furthermore, there is a tendency that the effect of the present invention can be more effectively exhibited by the use of MX nylon.

Straight-chain aliphatic α,ω-dibasic acids that can be preferably used as one raw material of MX nylons are straight-chain aliphatic α,ω-dibasic acids containing 6 to 20 carbon atoms such as adipic acid, sebacic acid, suberic acid, dodecanedioic acid, eicosadienoic acid and the like. Among these straight-chain aliphatic α,ω-dibasic acids, adipic acid is especially preferred in terms of moldability, the balance among performances of molded articles and the like.

Xylylenediamines used as the other raw material of MX nylons include m-xylylenediamine or xylylenediamine mixtures of p-xylylenediamine and m-xylylenediamine. The molar ratio of m-xylylenediamine and p-xylylenediamine (m-xylylenediamine/p-xylylenediamine) in the xylylenediamine mixtures is preferably 55/45 to 100/0, more preferably 70/30 to 100/0. The molar proportion of p-xylylenediamine is preferably less than 45 mol % because the melting point of the polyamide resins can be kept low, which makes it easy to polymerize the MX nylons or to mold compositions containing the MX nylons.

Description about thermoplastic polyester resins can be found in paragraphs 0013 to 0016 of JP-A2010-174223, the contents of which are incorporated herein. For example, polyester resins include a polybutylene terephthalate resin, or a mixture containing 60% by weight or more, preferably 80% by weight or more of a polybutylene terephthalate resin.

Description about polyphenylenesulfide resins can be found in paragraphs 0014 to 0016 of JP-A-Hei-10-292114, paragraphs 0011 to 0013 of JP-A-Hei-10-279800 and paragraphs 0011 to 0015 of JP-A-2009-30030, the contents of which are incorporated herein.

The amount of the thermoplastic resin contained in the thermoplastic resin composition of the present invention is preferably 35% by weight or more, more preferably 40% by weight or more in total.

<Glass Fiber>

The thermoplastic resin composition of the present invention further comprises a glass fiber. The incorporation of a glass fiber can improve mechanical strength of a resin molded article. In addition, the incorporation of a glass fiber can also further improve dimensional precision. A single type of glass fiber may be used or two or more types of glass fiber may be used in combination.

The glass fiber used in the present invention has a composition comprising $SiO_2$ and $Al_2O_3$ in a proportion of 60 to 70% by weight of $SiO_2$ and 20 to 30% by weight of $Al_2O_3$. Moreover, the glass fiber used in the present invention may further comprise B (boron) along with $SiO_2$ and $Al_2O_3$, in which case the B (boron) content is preferably 1% by weight or less. Further, the glass fiber used in the present invention preferably has a tensile modulus of elasticity of 80 GPa or more.

Specifically, an example of the glass fiber used in the present invention is S-glass (high strength glass). The use of a glass fiber having such a composition can improve the mechanical strength (for example, flexural stress, flexural modulus of elasticity, charpy impact strength (notched and unnotched) and the like) of an obtained resin molded article.

Conventionally, E-glass (electrical glass) has been used in thermoplastic resin composition, but our studies revealed that the mechanical strength of a resin molded article obtained by using E-glass was difficult to maintain at a high level. In contrast, the use of a glass fiber according to the present invention comprising $SiO_2$ and $Al_2O_3$ in a proportion of 60 to 70% by weight of $SiO_2$ and 20 to 30% by weight of $Al_2O_3$ to improve the strength of the obtained resin molded article.

Thus, an example of a preferred embodiment of the present invention includes an embodiment wherein the glass fiber substantially consists of the glass fiber comprising $SiO_2$ and $Al_2O_3$ in a proportion of 60 to 70% by weight of $SiO_2$ and 20 to 30% by weight of $Al_2O_3$.

The glass fiber used in the present invention may have been surface-treated with a silane coupling agent such as γ-methacryloxypropyltrimethoxysilane, γ-glycidoxypropyltrimethoxysilane, γ-aminopropyltriethoxysilane or the like. The amount of the silane coupling agent deposited is typically 0.01 to 1% by weight based on the weight of the glass fiber. Further, the glass fiber may be used after the glass fiber has been surface-treated as appropriate with a lubricant such as a fatty acid amide compound, a silicone oil or the like; an antistatic agent such as a quaternary ammonium salt or the like; a resin having a film-coating ability such as an epoxy resin, a urethane resin or the like; or a mixture of a resin having a film-coating ability with a heat stabilizer or a flame retardant or the like.

The glass fiber used in the present invention preferably has an average diameter of 20 μm or smaller, and more preferably 1 to 15 μm from the viewpoint of further improvement in the balance among physical properties (strength, rigidity, heat resistant rigidity, impact strength), and of further reduction in warping of mold. The glass fiber used in the present invention may have any cross-sectional shape of circle, cocoon, ellipse, oval and rectangle without special limitation, among which circle is preferable. By using the glass fiber which satisfies the predetermined compositional ratio and has a circular cross section, the effect of the present invention tends to be exhibited more effectively.

The glass fiber is not specifically limited to any length, and can be used by selecting glass fibers from long fiber bundles (rovings), short fiber bundles (chopped strands) and the like. Such glass fiber bundles are each preferably composed of 100 to 5000 fibers. Further, the glass fiber may be a milled strand known as so-called milled fiber or glass powder or a single continuous strand called sliver so far as the glass fiber has an average length of 0.1 mm or more in the thermoplastic resin composition after the glass fiber has been kneaded.

The amount of mixing of the glass fiber in the thermoplastic resin composition of the present invention, per 100 parts by weight of thermoplastic resin, is generally 10 to 200 parts by weight, preferably 20 to 190 parts by weight, more preferably 30 to 180 parts by weight, and furthermore preferably 40 to 150 parts by weight. In the present invention, the thermoplastic resin composition may contain other glass fiber (for example, E-glass) in addition to the glass fiber containing $SiO_2$ and $Al_2O_3$ in a proportion of 60 to 70% by weight of $SiO_2$ and 20 to 30% by weight of $Al_2O_3$. It is, however, preferable that the amount of the other glass fiber is 5% by weight of less of the amount of the glass fiber contained in the composition of the present invention, and is more preferably 1% by weight or less. Also other inorganic fiber may be contained. In the thermoplastic resin composition of the present invention, the thermoplastic resin and the inorganic fiber (preferably glass fiber, and more preferably a glass fiber containing $SiO_2$ and $Al_2O_3$ in a proportion of 60 to 70% by weight of $SiO_2$ and 20 to 30% by weight of $Al_2O_3$) preferably account for 70% by weight or more of the whole components, and more preferably account for 80% by weight or more of the whole components.

<Additive Having a Mohs Hardness of 5.5 or Larger>

The thermoplastic resin composition of the present invention further contains an additive having a Mohs hardness of 5.5 or larger. By using a predetermined glass fiber, the present invention is now possible to keep an excellent mechanical strength even if such hard additive is added. The additive having a Mohs hardness of 5.5 or larger preferably has a Mohs hardness of 5.5 to 8.0, and more preferably 5.8 to 7.5. Within these ranges, the effect of the present invention tends to be exhibited more effectively.

The additive having a Mohs hardness of 5.5 or larger used in the present invention is exemplified, without special limitation, by iron oxide, titanium oxide, copper-chromium oxide, alumina and tungsten carbide. In particular, titanium oxide is preferable since titanium oxide can not only increase whiteness, but can also increase hiding power and surface reflectivity.

The amount of mixing of the additive having a Mohs hardness of 5.5 or larger in the thermoplastic resin composition of the present invention, per 100 parts by weight of thermoplastic resin, is preferably 0.01 to 30 parts by weight, preferably 0.1 to 25 parts by weight, and more preferably 1 to 15 parts by weight. In particular, by limiting the amount of mixing of titanium oxide within these ranges, it becomes now possible to suppress the reflectivity from decreasing after annealing.

Among commercially available products of titanium oxide, it is preferable to use titanium oxide having an amount of titanium oxide of 80% by weight or more, taking the whiteness and hiding power into account. Titanium oxide usable in the present invention is exemplified by titanium monoxide (TiO), dititanium trioxide ($Ti_2O_3$) and titanium dioxide ($TiO_2$), among which titanium dioxide is preferable, although any of TiO, $Ti_2O_3$ and $TiO_2$ are usable. Titanium oxide preferably used has a rutile-type crystal structure.

Titanium oxide preferably has an average primary particle size of 1 μm or smaller, more preferably in the range from 0.001 to 0.5 μm, and furthermore preferably in the range from 0.002 to 0.1 μm. By limiting the average particle size of titanium oxide within these ranges, and by limiting the amount of mixing within the above-described ranges, it is now possible to obtain the thermoplastic resin composition having high levels of whiteness and surface reflectivity.

Titanium oxide usable herein may have a treated surface. Surface treatment agent is preferably composed of an inorganic and/or organic material. Specific examples thereof include metal oxides such as silica, alumina and zinc oxide; and organic materials such as silane coupling agent, titanium coupling agent, organic acid, polyol and silicone. Titanium oxide usable herein is also commercially available. Titanium oxide usable herein may be obtained by properly crushing cluster or product having a large average grain size, and by optionally classifying titanium oxide through a sieve or the like, so as to adjust the average grain size of titanium oxide within the above-described ranges.

In the present invention, the amount of mixing of the additive having a Mohs hardness of 4.5 or smaller (in particular, inorganic pigment) preferably accounts for 20% by weight or less of the amount of mixing of the additive having a Mohs hardness of 5.5 or larger, preferably 10% by weight or less, and particularly 5% by weight or less.

<Talc>

The thermoplastic resin composition of the present invention may further contain talc. By mixing the talc, the dimensional stability and product appearance may be improved. By mixing the talc, also crystallization of the thermoplastic resin may be accelerated. The talc usable herein may have the surface treated with at least one compound selected from polyorganohydrogen siloxanes and organopolysiloxanes. In this case, the amount of adhesion of siloxane compound on the talc is preferably 0.1 to 5% by weight of the talc.

The amount of talc contained in the thermoplastic resin composition of the present invention is preferably 0.01 to 10 parts by weight, more preferably 0.05 to 8 parts by weight, even more preferably 0.5 to 5 parts by weight per 100 parts by weight of the thermoplastic resin compositions. When talc has been surface-treated with a siloxane compound, the amount of talc surface-treated with the siloxane compound should preferably fall within the ranges defined above.

<Mold Release Agent>

The thermoplastic resin composition of the present invention may further comprise a mold release agent. The mold release agent is mainly used to improve productivity during molding of the resin composition. Mold release agents include, for example, aliphatic carboxylic acid amides, aliphatic carboxylic acids, esters of aliphatic carboxylic acids and alcohols, aliphatic hydrocarbon compounds having a number average molecular weight of 200 to 15000, polysiloxane silicone oils and the like. Among these mold release agents, carboxylic acid amide compounds are especially preferred.

Aliphatic carboxylic acid amides include, for example, compounds obtained by a dehydration reaction of a higher aliphatic monocarboxylic acid and/or polybasic acid with a diamine.

Higher aliphatic monocarboxylic acids preferably include saturated aliphatic monocarboxylic acids and hydroxycarboxylic acids containing 16 or more carbon atoms such as palmitic acid, stearic acid, behenic acid, montanic acid, 12-hydroxystearic acid and the like.

Polybasic acids include, for example, aliphatic dicarboxylic acids such as malonic acid, succinic acid, adipic acid, sebacic acid, pimelic acid and azelaic acid; aromatic dicarboxylic acids such as phthalic acid and terephthalic acid; alicyclic dicarboxylic acids such as cyclohexanedicarboxylic acid, cyclohexylsuccinic acid and the like.

Diamines include, for example, ethylenediamine, 1,3-diaminopropane, 1,4-diaminobutane, hexamethylenediamine, m-xylylenediamine, tolylenediamine, p-xylylenediamine, phenylenediamine, isophoronediamine and the like.

Carboxylic acid amide compounds preferably include compounds obtained by polycondensing stearic acid, sebacic acid and ethylenediamine, more preferably compounds obtained by polycondensing 2 moles of stearic acid, 1 mole of sebacic acid and 2 moles of ethylenediamine. Further, bisamide compounds obtained by reacting a diamine with an aliphatic carboxylic acid such as N,N'-methylenebisstearic acid amide or N,N'-ethylenebisstearic acid amide as well as dicarboxylic acid amide compounds such as N,N'-dioctadecylterephthalic acid amide can also be preferably used.

Aliphatic carboxylic acids include, for example, saturated or unsaturated aliphatic mono-, di- or tricarboxylic acids. The aliphatic carboxylic acids here also include alicyclic carboxylic acids. Among them, preferred aliphatic carboxylic acids are mono- or dicarboxylic acids containing 6 to 36 carbon atoms, more preferably saturated aliphatic monocarboxylic acids containing 6 to 36 carbon atoms. Specific example of such aliphatic carboxylic acids include palmitic acid, stearic acid, caproic acid, capric acid, lauric acid, arachic acid, behenic acid, lignoceric acid, cerotic acid, melissic acid, tetratriacontanoic acid, montanic acid, adipic acid, azelaic acid, etc.

Aliphatic carboxylic acids that can be used in esters of aliphatic carboxylic acids and alcohols include, for example, the aliphatic carboxylic acids listed above. Alcohols include, for example, saturated or unsaturated mono- or polyalcohols. These alcohols may be substituted by a substituent such as a fluorine atom or an aryl group. Among them, saturated mono- or polyalcohols containing 30 or less carbon atoms are preferred, more preferably saturated aliphatic or alicyclic monoalcohols or saturated aliphatic polyalcohols containing 30 or less carbon atoms.

Specific examples of such alcohols include octanol, decanol, dodecanol, stearyl alcohol, behenyl alcohol, ethylene glycol, diethylene glycol, glycerol, pentaerythritol, 2,2-dihydroxyperfluoropropanol, neopentylene glycol, ditrimethylolpropane, dipentaerythritol and the like.

Specific examples of esters of aliphatic carboxylic acids and alcohols include beeswax (a mixture containing myricyl palmitate as a major component), stearyl stearate, behenyl behenate, stearyl behenate, glyceryl monopalmitate, glyceryl monostearate, glyceryl distearate, glyceryl tristearate, pentaerythritol monopalmitate, pentaerythritol monostearate, pentaerythritol distearate, pentaerythritol tristearate, pentaerythritol tetrastearate and the like.

Aliphatic hydrocarbons having a number average molecular weight of 200 to 15,000 include, for example, liquid paraffin, paraffin waxes, microcrystalline waxes, polyethylene waxes, Fischer-Tropsch waxes, α-olefin oligomers containing 3 to 12 carbon atoms and the like. It should be noted that the aliphatic hydrocarbons here also include alicyclic hydrocarbons. Preferably, the aliphatic hydrocarbons have a number average molecular weight of 5,000 or less.

The amount of the mold release agent contained is typically 0.001 parts by weight or more, preferably 0.01 parts by weight or more, and typically 2 parts by weight or less, preferably 1.5 parts by weight or less per 100 parts by weight of the total of the thermoplastic resin and the glass fiber. When the mold release agent is contained at 0.001 parts by weight or more per 100 parts by weight of the total of the thermoplastic resin and the glass fiber, releasability can be improved. When the mold release agent is contained at 2 parts by weight or less per 100 parts by weight of the total of the thermoplastic resin and the glass fiber, a decrease in hydrolysis resistance can be prevented and mold contamination during injection molding can also be prevented.

<Other Additives>

The thermoplastic resin composition of the present invention may further comprise various additives so far as the advantages of the present invention are not affected. Such additives include alkalis, heat stabilizers, flame retardants, light stabilizers, antioxidants, UV absorbers, dyes/pigments, fluorescent brightening agents, anti-dripping agents, anti-static agents, anti-fogging agents, lubricants, anti-blocking agents, flow improvers, plasticizers, dispersants, antibacterial agents, laser direct structuring additive (LDS additives) and the like. These components may be used alone or as a combination of two or more of them.

<Method of Manufacturing Thermoplastic Resin Composition>

The thermoplastic resin composition of the present invention may be prepared by mixing the above-described constituents according to any publicly known method. The method is exemplified by a method of adding the individual ingredients in the process of polycondensation reaction of the thermoplastic resin; a method of dry blending of the thermoplastic resin and the other ingredients; and a method of melting and kneading the individual constituents using an extruder. Among them, the method of melting and kneading the individual constituents using an extruder is preferable, by virtue of its simple operation and capability of producing a uniform composition. The extruder used for this process is preferably a twin screw extruder. Temperature of melting and kneading is preferably within the range from a temperature 5° C. higher than the melting point of the thermoplastic resin up to 350° C. For example, the description of JP-A-2007-302866 may be referred to, the content of which is incorporated into this specification.

<Resin Molded Article>

The thermoplastic resin composition of the present invention may be made into various types of resin molded articles, depending on types, applications and shapes of aimed molded articles, by any of methods generally used for molding the thermoplastic resin composition, which include injection molding, extrusion molding, press molding, blow molding, calendar molding and casting. Any of these methods of molding may be used in combination. Injection molding is particularly preferable, from aspects of simplicity of molding, mass productivity, and cost.

The resin molded article obtained from the thermoplastic resin composition of the present invention is usable for various applications including electronic components such as connector, switch, relay and printed circuit board; reflective mirror such as lamp reflector; sliding components such as gear and cam; automobile components such as air intake manifold; plumbing products such as sink; various decoration parts; film, sheet and fiber.

EXAMPLE

The present invention will further be detailed below referring to Examples. Materials, amount of use, ratio, details of processes, procedures of process and so forth described in Examples below may be modified arbitrarily, without departing from the spirit of the present invention. Accordingly, the scope of the present invention should not be construed to be limited by Examples below.

<Thermoplastic Resin>

PAMXD6: (from Mitsubishi Gas Chemical Company Inc.)

STABAMID 26 AE 1K: polyamide 66 (PA66) (from Rhodia)

Acid-modified polyphenylene ether (acid-modified PPE) (from Mitsubishi Engineering-Plastics Corporation)

<Glass Fiber>

S-glass (modulus of elongation: 86 GPa, $SiO_2$: 65% by weight, $Al_2O_3$: 25% by weight, B (boron): 0.001 to 0.01% by weight)

03T-296GH: glass fiber (E-glass (modulus of elongation: 72 GPa)) (from Nippon Electric Glass Co., Ltd.)

<Titanium Oxide>

Titanium dioxide: CR63 (from Ishihara Sangyo Kaisha, Ltd.), Mohs hardness=7.0

<Iron Oxide>

Ferric Oxide: 120ED (from Toda Kogyo Corp.), Mohs hardness=6.0

<Zinc Sulfide>

Zinc sulfide: Sachtolith HDS (from Sachtleben), Mohs hardness=3.0

<Talc>

Talc: Micron White 5000S (from Hayashi-Kasei Co., Ltd.)

<Mold Releasing Agent>

Light Amide WH-255 (from Kyoeisha Chemical Co., Ltd.)

<Compound>

The individual ingredients were precisely weighed according to the compositional ratios summarized in Table shown later, the ingredients excluding the glass fiber were then blended using a tumbler, fed into a twin-screw extruder (TEM26SS, from Toshiba Machine Co., Ltd.) from the base, melted, side-fed with the glass fiber, to produce resin pellets. Preset temperature of the extruder was 280° C.

<Preparation of ISO Tensile Test Piece>

The pellets obtained by the manufacturing method described above were dried at 80° C. for 5 hours, and subjected to injection molding using an injection molding machine (100T, from FANUC Corporation), conditioned at a cylinder temperature of 280° C., and a mold temperature of 130° C., to thereby produce an ISO tensile test piece (4 mm thickness).

Injection rate: Preset to 300 mm/s by calculating the flow rate of resin based on the cross sectional area at the center portion of the ISO tensile test piece. V-P change into dwelling was effected at a filling of approximately 95%. Dwelling was conducted at 500 kgf/cm$^2$ for 25 seconds, which are maximum possible values capable of avoiding flash.

<Bending Stress and Flexural Modulus>

In accordance with ISO 178, each ISO tensile test piece (4 mm thick) was subjected to measurement of bending stress (in MPa) and flexural modulus (in GPa) at 23° C.

<Charpy Impact Strength>

In accordance with ISO 179-1 or ISO 179-2, each ISO tensile test piece (4 mm thick) obtained above was subjected to measurements of notched charpy impact strength and unnotched charpy impact strength, at 23° C.

<L-Value>

L-value (brightness) of each test piece of 60×60 mm in size and 2 mm in thickness was measured using a color difference meter (Spectro Color Meter SE2000) (from Nippon Denshoku Industries Co., Ltd.), and evaluated as follows. Results were summarized in Table 1.

○: L-value≥85 (good whiteness)

x: L-value<85 (poor whiteness)

<Hiding Power>

Each test piece of 60×60 mm in size and 1 mm in thickness was illuminated from the back using an LED light, and the hiding power was evaluated based on whether the light is visible from the front.

○: Light invisible.
x: Light visible.
Results were summarized in Table 1 below.

composition of the present invention, making use of the glass fiber together with the additive having a Mohs hardness of a specific level or higher.

TABLE 1

|  |  |  | Example 1 | Example 2 | Comparative example 1 | Comparative example 2 | Comparative example 3 | Comparative example 4 | Reference example 1 | Reference example 2 |
|---|---|---|---|---|---|---|---|---|---|---|
| Thermoplastic Resin | PAMXD6 | parts by weight | 100 | 100 | 100 | 100 | 100 | 100 | 100 | 100 |
|  | STABAMID26AE1K |  | 12 | 12 | 12 | 12 | 12 | 12 | 11 | 12 |
|  | acid-modified PPE |  |  |  | 67 |  | 67 |  |  | 66 |
| Glass Fiber | S-glass |  | 128 | 150 |  |  |  | 128 |  |  |
|  | 03T-296GH (E-glass) |  |  |  | 128 | 150 |  |  | 114 | 149 |
| Titanium Oxide (Mohs hardness = 7) | CR-63 |  | 13 |  | 13 |  |  |  |  |  |
| Iron Oxide (Mohs hardness = 6) | 120ED |  |  | 1 |  | 1 |  |  |  |  |
| Zinc Sulfide (Mohs hardness = 3) | Sachtolith HDS |  |  |  |  |  | 13 | 13 |  |  |
| Talc | 5000S |  | 3 | 3 | 3 | 3 | 3 | 3 | 2 | 3 |
| Mold Releasing Agent | WH-255 |  | 1 | 1 | 1 | 1 | 1 | 1 | 1 | 1 |
| Results of evaluation | Bending Stress (MPa) |  | 334 | 340 | 270 | 260 | 385 | 350 | 393 | 335 |
|  | (Retention rate %) |  | 73 | 87 | 67 | 78 | 84 | 87 | — | — |
|  | Flexural Modulus (GPa) |  | 20.7 | 15.0 | 18.5 | 13.5 | 20.1 | 18.5 | 19.2 | 13.5 |
|  | Charpy Impact Value (kJ/m$^2$) | notched | 11 | 16 | 4 | 10 | 15 | 11 | 14 | 15 |
|  |  | (Retention rate %) | 50 | 70 | 28 | 67 | 66 | 78 | — | — |
|  |  | unnotched | 55 | 80 | 33 | 50 | 70 | 60 | 53 | 80 |
|  |  | (Retention rate %) | 77 | 89 | 53 | 63 | 97 | 97 | — | — |
|  | Color difference | L-Value | ○ | — | ○ | — | X | X | — | — |
|  | Hiding Power |  | ○ | — | ○ | — | X | X | — | — |

* (Retention rate): Calculated as a reference value when the additive which having a Mohs hardness of 5.5 or larger is not added.

As is clearly understood from Table 1 above, when the additives each having a Mohs hardness of 5.5 or larger, such as titanium oxide, were added to the generally-used thermoplastic resin compositions containing E-glass (Reference Examples 1 and 2) aimed at coloring the resin composition, the strength of glass fibers was impaired, and the bending stress and charpy impact strength were reduced considerably. More specifically, in Comparative Example 1 corresponded to a composition of Reference Example 1 added with titanium oxide, and in Comparative Example 2 corresponded to a composition of Reference Example 2 added with iron oxide, the bending stress decreased from the values of Reference Examples 1 and 2 down to values of 67 to 78%, respectively, and also the charpy impact strength decreased down to values of 67% or below.

In contrast, Example 1 and Example 2, making use of the specific glass fibers specified by the present invention as the glass fiber, were found to be improved in the mechanical strength over Comparative Example 1 and Comparative Example 2 making use of E-glass, and to be recovered up to levels comparative to those of Reference Examples 1 and 2 not using the additive having a Mohs hardness of 5.5 or larger.

Note that only small differences in the mechanical strength, in particular in the bending stress and charpy impact strength, were found between the composition making use of the additive having a Mohs hardness of 3 together with E-glass (Comparative Example 3), and the composition making use of the additive having a Mohs hardness of 3 together with the specific glass fiber specified by the present invention (Comparative Example 4). This indicates that the mechanical strength differentially increased in the resin Accordingly, it was confirmed that the present invention is successful in providing the thermoplastic resin composition capable of producing a resin molded article excellent in mechanical strength.

Meanwhile, the thermoplastic resin composition, added with zinc sulfide having a small Mohs hardness in order to whiten the material (Comparative Example 3), was found to show a poor hiding power, although the bending stress, flexural modulus and charpy impact strength were kept at appropriate levels. In contrast, the thermoplastic resin composition of Example 1, added with titanium oxide, was found to be not only good in bending stress, flexural modulus and charpy impact strength, but also good enough in whiteness and hiding power.

What is claimed is:

1. A thermoplastic resin composition comprising:
a thermoplastic resin comprising a polyamide resin;
relative to 100 parts by weight of the thermoplastic resin,
1 to 15 parts by weight of an additive having a Mohs hardness of 5.5 or larger; and
40 to 150 parts by weight of glass fiber,
wherein the glass fiber is composed of S-glass and comprises $SiO_2$ and $Al_2O_3$ in a proportion of 60 to 70% by weight of $SiO_2$ and 20 to 30% by weight of $Al_2O_3$;
the additive having a Mohs hardness of 5.5 or larger is selected from the group consisting of iron oxide, titanium oxide, copper-chromium oxide, alumina, and tungsten carbide;
wherein the thermoplastic resin accounts for 35% by weight or more of the thermoplastic resin composition;

wherein the thermoplastic resin and the glass fiber account for 80% by weight or more of the thermoplastic resin composition;

wherein the thermoplastic resin composition is free from a flame retardant;

wherein the thermoplastic resin composition further comprises polyphenylene ether resin;

wherein at least one species of the thermoplastic resin is a polyamide resin obtained by polycondensation of a straight chain α,ω-aliphatic dibasic acid and xylylenediamine;

wherein the thermoplastic resin composition contains polyamide 66 and/or polyamide 6 in a content of 1 to 20% by weight of the total polyamide resin; and wherein the polyphenylene ether resin is an acid-modified polyphenylene ether.

2. The thermoplastic resin composition of claim 1, wherein the glass fiber has a modulus of elongation of 80 GPa or larger.

3. The thermoplastic resin composition of claim 1, further comprising talc and/or a mold releasing agent.

4. The thermoplastic resin composition of claim 1, wherein the additive having a Mohs hardness of 5.5 or larger is titanium oxide.

5. The thermoplastic resin composition of claim 2, further comprising talc and/or a mold releasing agent.

6. The thermoplastic resin composition of claim 2, wherein the additive having a Mohs hardness of 5.5 or larger is titanium oxide.

7. The thermoplastic resin composition of claim 1, wherein the additive having a Mohs hardness of 5.5 or larger is iron oxide.

8. A resin molded article obtained by molding the thermoplastic resin composition according to claim 1.

* * * * *